US012769380B2

(12) United States Patent
Kang et al.

(10) Patent No.: US 12,769,380 B2
(45) Date of Patent: Oct. 20, 2026

(54) APPARATUS AND METHOD FOR GPU POWER MANAGEMENT IN DISTRIBUTED DEEP LEARNING

(71) Applicant: Electronics and Telecommunications Research Institute, Daejeon (KR)

(72) Inventors: Ki-Dong Kang, Daejeon (KR); Hong-Yeon Kim, Daejeon (KR); Baik-Song An, Seoul (KR); Myung-Hoon Cha, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 160 days.

(21) Appl. No.: 18/933,007

(22) Filed: Oct. 31, 2024

(65) Prior Publication Data

US 2025/0264922 A1 Aug. 21, 2025

(30) Foreign Application Priority Data

Feb. 20, 2024 (KR) ........................ 10-2024-0024273

(51) Int. Cl.
*G06F 1/26* (2006.01)

(52) U.S. Cl.
CPC ...................................... *G06F 1/26* (2013.01)

(58) Field of Classification Search
CPC .......................................................... G06F 1/26
USPC .......................................................... 713/300
See application file for complete search history.

(56) References Cited

U.S. PATENT DOCUMENTS 6,938,176 B1 * 8/2005 Alben .................. G06F 1/3237 713/323
7,076,002 B1 * 7/2006 Ramirez-Mireles ......................... H04L 27/2662 370/523
7,913,071 B2 * 3/2011 Mallik .................. G06F 1/3243 455/574
9,137,063 B2 * 9/2015 Zerbe ................ H04L 25/03057
9,742,603 B1 * 8/2017 Bandi ................... H04L 7/0091
10,541,841 B1 * 1/2020 Sun ........................ H04L 7/0008
2003/0206686 A1 * 11/2003 Pau .................... H04Q 11/0005 385/18
2012/0079162 A1 * 3/2012 Jaramillo ................. G09G 5/12 710/316
2014/0006831 A1 * 1/2014 Keish ........................ G06F 1/32 713/324

(Continued)

FOREIGN PATENT DOCUMENTS

KR 10-2023-0051064 A 4/2023

OTHER PUBLICATIONS

Sangjin Choi et al., "ENVPIPE: Performance-preserving DNN Training Framework for Saving Energy", USENIX Annual Technical Conference, Jul. 10-12, 2023, pp. 851-864.

*Primary Examiner* — Paul R. Myers
(74) *Attorney, Agent, or Firm* — Sughrue Mion, PLLC

(57) ABSTRACT

Disclosed herein is an apparatus and method for Graphics Processing Unit (GPU) power management in distributed deep learning. In the method, a training process or inference process of the distributed deep learning is performed through two or more GPUs, and the method may include identifying at least one communication section during the training process or inference process of the distributed deep learning and performing control such that the voltage and frequency of the GPU are optimized during the at least one communication section.

20 Claims, 4 Drawing Sheets

(56) References Cited

U.S. PATENT DOCUMENTS

| | | | | |
|---|---|---|---|---|
| 2014/0273856 | A1* | 9/2014 | Kyles | H04B 1/401 455/41.2 |
| 2015/0261718 | A1* | 9/2015 | Campbell | G06F 13/4081 710/302 |
| 2017/0031430 | A1* | 2/2017 | Ansorregui | G06F 1/3206 |
| 2017/0359779 | A1* | 12/2017 | Wang | H04J 11/00 |
| 2019/0258528 | A1* | 8/2019 | Yeung | G06F 9/4893 |
| 2020/0142466 | A1 | 5/2020 | Naik et al. | |
| 2021/0064444 | A1 | 3/2021 | Rao et al. | |
| 2021/0135790 | A1* | 5/2021 | Files | H04L 1/0002 |
| 2023/0079978 | A1* | 3/2023 | Bolotin | G06N 3/09 713/322 |
| 2023/0297442 | A1 | 9/2023 | Seo et al. | |
| 2024/0211019 | A1* | 6/2024 | Oreifej | G06F 1/324 |
| 2025/0220593 | A1* | 7/2025 | Wakudkar | H04W 52/365 |

* cited by examiner

APPARATUS AND METHOD FOR GPU POWER MANAGEMENT IN DISTRIBUTED DEEP LEARNING

CROSS REFERENCE TO RELATED APPLICATION

This application claims the benefit of Korean Patent Application No. 10-2024-0024273, filed Feb. 20, 2024, which is hereby incorporated by reference in its entirety into this application.

BACKGROUND OF THE INVENTION

1. Technical Field

The disclosed embodiment relates to technology for Graphics Processing Unit (GPU) power management in distributed training or inference of deep learning.

2. Description of the Related Art

As deep-learning models have recently become larger, distributed deep learning, which requires multiple Graphics Processing Units (GPUs) for training and inference of deep-learning models, has become more common. At the same time, as multiple GPUs are used for such large-scale distributed deep learning, energy consumption emerges as a new problem.

As a solution to this problem, a GPU power management method that improves energy efficiency without learning performance degradation by utilizing pipeline bubble time caused in distributed deep-learning training based on pipeline parallelism, which is known as inter-operator parallelism, has been proposed.

However, because the proposed method uses pipeline bubbles for GPU power management, it is difficult to apply the method to distributed deep learning based on data parallelism and tensor parallelism, which are known as intra-operator parallelism.

SUMMARY OF THE INVENTION

An object of the disclosed embodiment is to manage GPU power so as to mitigate energy inefficiency caused in a distributed training or inference process of deep learning.

Another object of the disclosed embodiment is to enable GPU power management to be applied not only to distributed deep learning based on pipeline parallelism but also to distributed deep learning based on data parallelism and tensor parallelism.

A method for Graphics Processing Unit (GPU) power management in distributed deep learning, the training process or inference process of which is performed through two or more GPUs, according to an embodiment may include identifying at least one communication section during the training process or inference process of the distributed deep learning and performing control such that the voltage and frequency of the GPU are optimized during the at least one communication section.

Here, performing the control may comprise setting the voltage and frequency of the GPU during the at least one communication section to minimum values at which performance of the training process or inference process of the distributed deep learning is not degraded.

Here, performing the control may include inserting voltage and frequency control code into the GPU at at least one of a time point before the at least one communication section, or a time point after the at least one communication section, or a combination thereof.

Here, performing the control may include checking whether the voltage and frequency of the GPU are minimum values; and setting the voltage and frequency as the optimal voltage and frequency of the GPU when the voltage and frequency are the minimum values.

Here, performing the control may include checking whether the voltage and frequency of the GPU are minimum values, decreasing the voltage and frequency of the GPU by a predetermined value when the voltage and frequency are not the minimum values, monitoring performance degradation after performing distributed training or inference in the GPU, and setting a previous voltage and frequency as the optimal voltage and frequency of the GPU when performance degradation occurs.

Here, performing the control may proceed to decreasing the voltage and frequency of the GPU by the predetermined value when performance degradation does not occur.

Here, the method for GPU power management in distributed deep learning according to an embodiment may further include applying the optimized voltage and frequency of the GPU to the communication section while the distributed deep learning is being performed.

Here, identifying the at least one communication section, performing the control, and applying the optimized voltage and frequency may be performed for each of the two or more GPUs.

An apparatus for GPU power management in distributed deep learning according to an embodiment includes memory in which at least one program is recorded and a processor for executing the program. The program may perform identifying at least one communication section during the training process or inference process of the distributed deep learning in two or more GPUs and performing control such that the voltage and frequency of the GPU are optimized during the at least one communication section.

Here, when performing the control, the program may set the voltage and frequency of the GPU during the at least one communication section to minimum values at which performance of the training process or inference process of the distributed deep learning is not degraded.

Here, when performing the control, the program may perform inserting voltage and frequency control code into the GPU at at least one of a time point before the at least one communication section, or a time point after the at least one communication section, or a combination thereof.

Here, when performing the control, the program may perform checking whether the voltage and frequency of the GPU are minimum values; and setting the voltage and frequency as the optimal voltage and frequency of the GPU when the voltage and frequency are the minimum values.

Here, when performing the control, the program may perform checking whether the voltage and frequency of the GPU are minimum values, decreasing the voltage and frequency of the GPU by a predetermined value when the voltage and frequency are not the minimum values, monitoring performance degradation after performing distributed training or inference in the GPU, and setting a previous voltage and frequency as the optimal voltage and frequency of the GPU when performance degradation occurs.

Here, when performing the control, the program may proceed to decreasing the voltage and frequency of the GPU by the predetermined value when performance degradation does not occur.

Here, the program may further perform applying the optimized voltage and frequency of the GPU to the communication section while the distributed deep learning is being performed.

Here, the program may perform identifying the at least one communication section, performing the control, and applying the optimized voltage and frequency for each of the two or more GPUs.

A method for GPU power management in distributed deep learning, the training process or inference process of which is performed through two or more GPUs, according to an embodiment may include identifying at least one communication section during the training process or inference process of the distributed deep learning and setting the voltage and frequency of each of the two or more GPUs during the at least one communication section to minimum values at which performance of the training process or inference process of the distributed deep learning is not degraded.

Here, setting the voltage and frequency may include inserting voltage and frequency control code into the GPU at at least one of a time point before the at least one communication section, or a time point after the at least one communication section, or a combination thereof.

Here, setting the voltage and frequency may include checking whether the voltage and frequency of the GPU are the minimum values; and setting the voltage and frequency as the optimal voltage and frequency of the GPU when the voltage and frequency are the minimum values.

Here, setting the voltage and frequency may include checking whether the voltage and frequency of the GPU are the minimum values, decreasing the voltage and frequency of the GPU by a predetermined value when the voltage and frequency are not the minimum values, monitoring performance degradation after performing distributed training or inference in the GPU, and setting a previous voltage and frequency as the optimal voltage and frequency of the GPU when performance degradation occurs. When performance degradation does not occur, setting the voltage and frequency may procced to decreasing the voltage and frequency of the GPU by the predetermined value.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
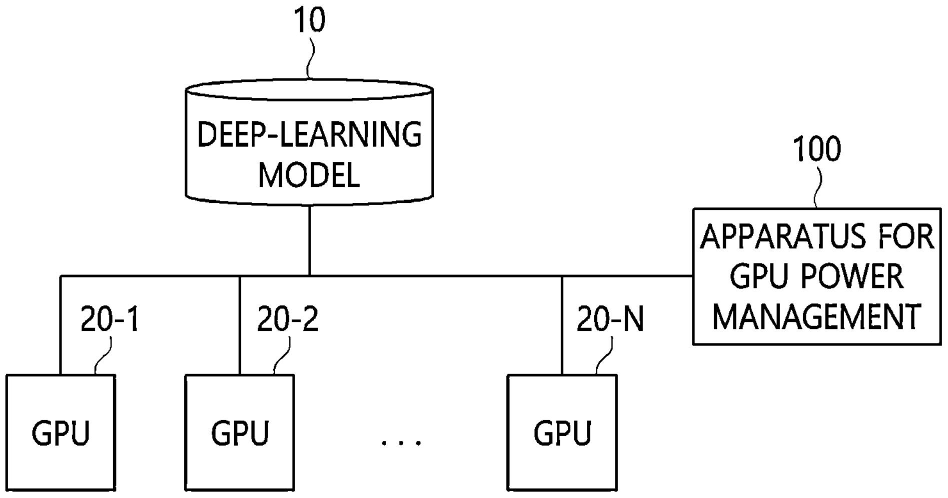
FIG. 1 is a schematic block diagram of a distributed deep-learning system to which an embodiment is applied.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

FIG. 1 is a schematic block diagram of a distributed deep-learning system to which an embodiment is applied.

Referring to FIG. 1, the distributed deep-learning system according to an embodiment may include multiple GPUs 20-1, 20-2, . . . , 20-N for performing distributed deep learning by being assigned a deep-learning model 10 and an apparatus 100 for GPU power management in distributed deep learning, which manages distributed deep learning and power of the multiple GPUs 20-1, 20-2, . . . , 20-N.

Here, the deep-learning model 10 is assigned to the multiple GPUs 20-1, 20-2, . . . , 20-N using at least one of data parallelism, or tensor parallelism, or a combination thereof, whereby a distributed deep-learning process may be performed.

The apparatus 100 for GPU power management in distributed deep learning according to an embodiment performs management such that the power of each of the multiple GPUs 20-1, 20-2, . . . , 20-N is optimized while the training process or inference process of the deep-learning model 10 is being performed through the multiple GPUs 20-1, 20-2, . . . , 20-N.

Figure 2:
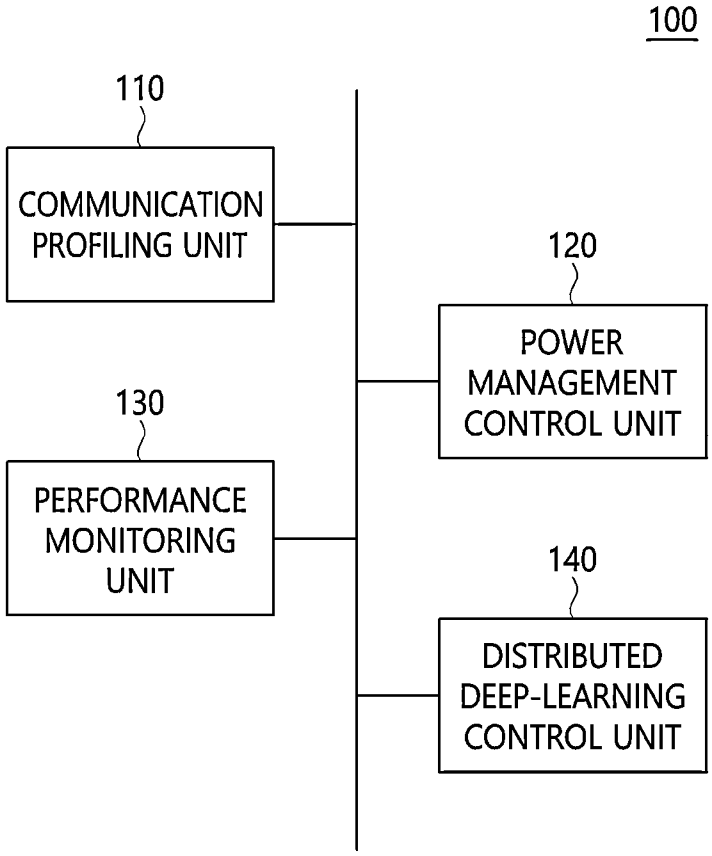
FIG. 2 is a schematic internal configuration diagram of an apparatus for GPU power management in distributed deep learning according to an embodiment.

FIG. 2 is a schematic internal configuration diagram of an apparatus for GPU power management in distributed deep learning according to an embodiment.

Referring to FIG. 2, the apparatus 100 for GPU power management in distributed deep learning (referred to as the 'management apparatus' hereinbelow) according to an embodiment may include a communication profiling unit 110, a power management control unit 120, and a performance monitoring unit 130.

The management apparatus 100 according to an embodiment may further include a distributed deep-learning control unit 140.

The communication profiling unit 110 identifies at least one communication section occurring during training and inference of distributed deep learning.

The power management control unit 120 applies power management technology in the identified at least one communication section. That is, the power management control unit 120 performs control such that the voltage and frequency of a GPU are optimized during the at least one communication section.

Here, the power management control unit 120 may set the voltage and frequency of the GPU during the at least one communication section to minimum values at which the performance of the training process or inference process of distributed deep learning is not degraded.

Here, the power management control unit 120 may insert voltage and frequency control code into the GPU at at least one of a time point before the at least one communication section, or a time point after the at least one communication section, or a combination thereof.

Here, the power management control unit 120 may check whether the voltage and frequency of the GPU are minimum values, and when the corresponding values are the minimum values, the power management control unit 120 may set the corresponding values as the optimal voltage and frequency of the GPU.

Here, when the voltage and frequency of the GPU are not the minimum values, the power management control unit 120 may decrease the voltage and frequency of the GPU by a predetermined value.

Here, the voltage and frequency of the GPU may be adjusted to decrease by the predetermined value in a stepwise manner.

In other words, when distributed training or inference is performed in the GPU in the state in which the voltage and frequency of the GPU are decreased, if performance is not degraded, the power management control unit 120 may repeatedly decrease the voltage and frequency of the GPU in a stepwise manner.

However, when performance degradation occurs in a performance degradation monitoring result, the power management control unit 120 may set the previous voltage and frequency as the optimal voltage and frequency of the GPU.

Here, performance degradation monitoring may be performed by the performance monitoring unit 130.

Meanwhile, the distributed deep-learning control unit 140 may apply the determined power management state to the communication section while distributed deep learning is being performed.

Figure 3:
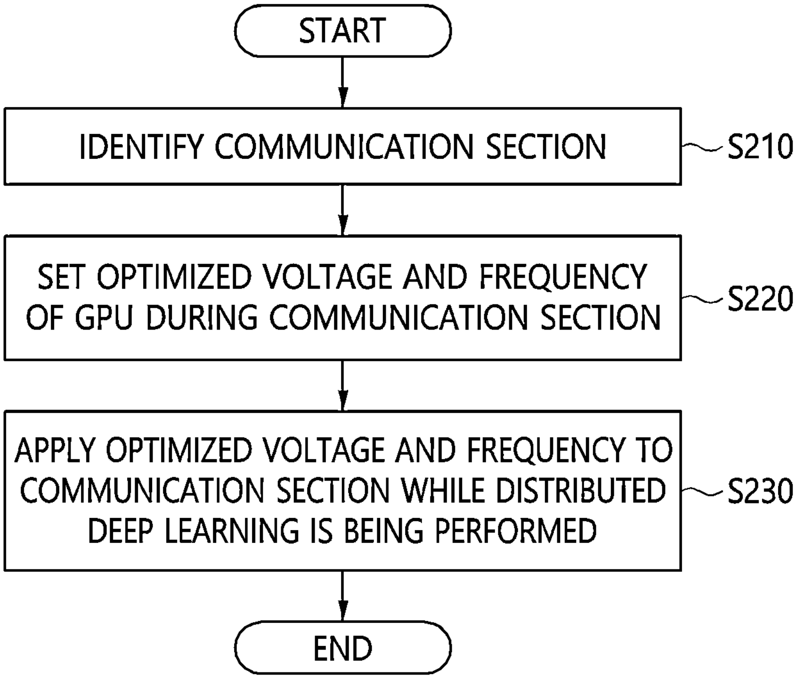
FIG. 3 is a flowchart for explaining a method for GPU power management in distributed deep learning according to an embodiment.

FIG. 3 is a flowchart for explaining a method for GPU power management in distributed deep learning according to an embodiment.

Referring to FIG. 3, in the method for GPU power management in distributed deep learning according to an embodiment, the training process or inference process of distributed deep learning is performed through two or more Graphics Processing Units (GPUs), and the method may include identifying at least one communication section during the training process or inference process of distributed deep learning at step S210 and performing control such that the voltage and frequency of the GPU are optimized during the at least one communication section at step S220.

The method for GPU power management in distributed deep learning according to an embodiment may further include applying the optimized voltage and frequency of the GPU to the communication section while distributed deep learning is being performed.

Here, steps from S210 to S230 may be performed for each of the two or more GPUs.

Figure 4:
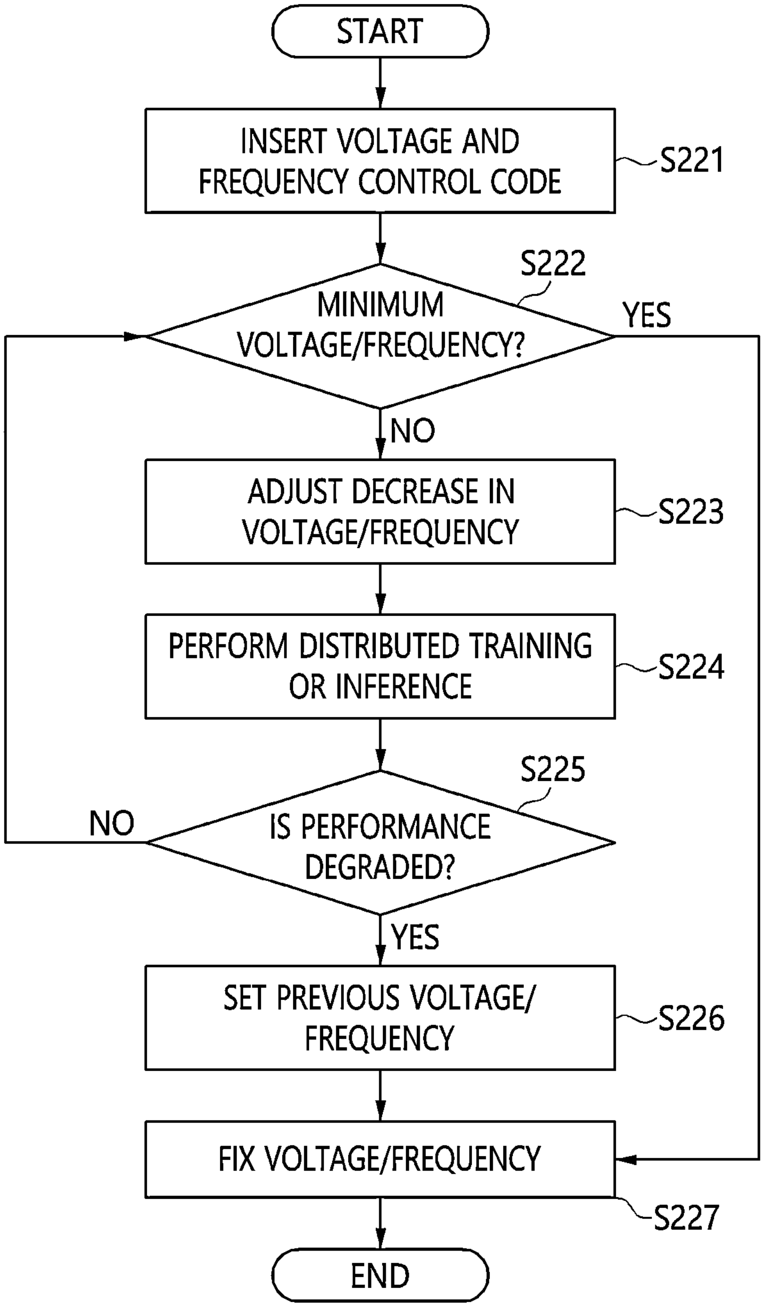
FIG. 4 is a flowchart for explaining a step of performing control such that the voltage and frequency of a GPU are optimized according to an embodiment.

FIG. 4 is a flowchart for explaining a step of performing control such that the voltage and frequency of a GPU are optimized according to an embodiment.

Referring to FIG. 4, performing the control at step S220 may comprise setting the voltage and frequency of a GPU during at least one communication section to minimum values at which the performance of the training process or inference process of distributed deep learning is not degraded.

Here, performing the control at step S220 may include inserting voltage and frequency control code into the GPU at at least one of a time point before the at least one communication section, or a time point after the at least one communication section, or a combination thereof at step S221.

That is, the voltage and frequency control code is inserted before and after the communication section, whereby a low frequency may be used during the communication section.

Here, performing the control at step S220 may include checking whether the voltage and frequency of the GPU are the minimum values at step S222 and setting, when the voltage and frequency of the GPU are the minimum values, the corresponding values as the optimal voltage and frequency of the GPU at step S227.

That is, whether the current voltage and frequency of the GPU are the minimum values is checked in order to set the optimal voltage and frequency in terms of energy, and when the current voltage and frequency are the minimum values, the corresponding values are consistently used.

Here, performing the control at step S220 may include checking whether the voltage and frequency of the GPU are the minimum values at step S222, decreasing the voltage and frequency of the GPU by a predetermined value at step S223 when the voltage and frequency are not the minimum values, monitoring performance degradation at step S225 after performing distributed training or inference in the GPU at step S224, and setting a previous voltage and frequency as the optimal voltage and frequency of the GPU at step S226 when performance degradation occurs. That is, in order to prevent performance degradation, the previous voltage and frequency values are set, and the corresponding values are consistently used at step S227.

Here, performing the control at step S220 may proceed to checking whether the voltage and frequency of the GPU are the minimum values at step S222 when performance degradation does not occur at step S225.

In other words, if performance degradation does not occur, it is determined that energy efficiency can be more improved, so the process of performing control to further decrease the voltage and frequency is repeated, whereby the minimum voltage and frequency at which performance degradation does not occur are searched for and applied.

Here, the voltage and frequency of the GPU may be adjusted to decrease by a predetermined value in a stepwise manner.

In other words, the power management control unit 120 may repeatedly decrease the voltage and frequency of the GPU in a stepwise manner when performance is not degraded in a result of distributed training or inference performed in the GPU in the state in which the voltage and frequency of the GPU are decreased.

According to the embodiment described above, the energy consumption by GPUs may be significantly reduced without performance degradation by utilizing GPU power management during the communication time that occurs during training or inference of distributed deep learning.

Figure 5:
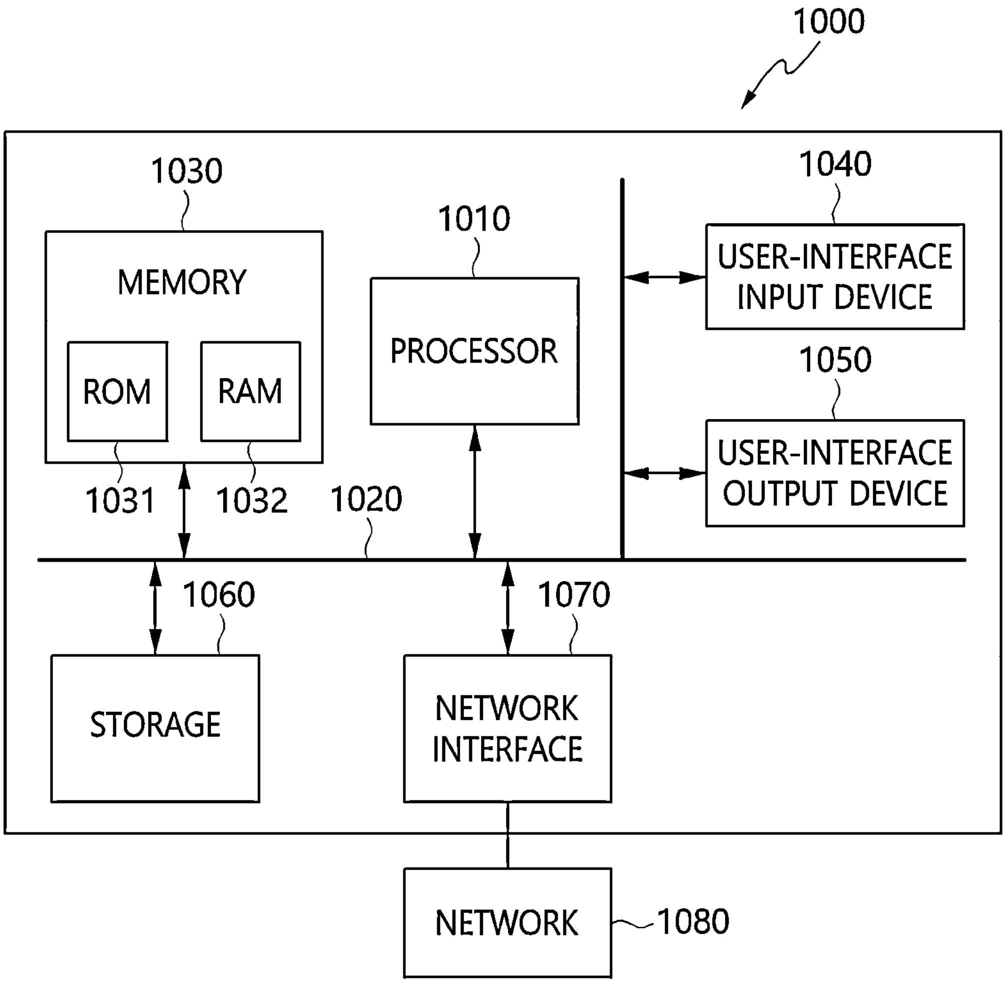
FIG. 5 is a view illustrating a computer system configuration according to an embodiment.

FIG. 5 is a view illustrating a computer system configuration according to an embodiment.

The apparatus 100 for GPU power management in distributed deep learning according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, energy inefficiency caused in the distributed training or inference process of deep learning may be mitigated.

The disclosed embodiment may be easily applied not only to distributed deep learning based on pipeline parallelism but also to distributed deep learning based on data parallelism and tensor parallelism.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. A method for Graphics Processing Unit (GPU) power management in distributed deep learning, a training process or inference process of which is performed through two or more GPUs, the method comprising:

identifying at least one communication section during the training process or inference process of the distributed deep learning; and performing control such that a voltage and frequency of the GPU are optimized during the at least one communication section.

2. The method of claim 1, wherein performing the control comprises setting the voltage and frequency of the GPU during the at least one communication section to minimum values at which performance of the training process or inference process of the distributed deep learning is not degraded.

3. The method of claim 1, wherein performing the control includes inserting voltage and frequency control code into the GPU at at least one of a time point before the at least one communication section, or a time point after the at least one communication section, or a combination thereof.

4. The method of claim 1, wherein performing the control includes checking whether the voltage and frequency of the GPU are minimum values; and when the voltage and frequency are the minimum values, setting the voltage and frequency as an optimal voltage and frequency of the GPU.

5. The method of claim 1, wherein performing the control includes checking whether the voltage and frequency of the GPU are minimum values;

when the voltage and frequency are not the minimum values, decreasing the voltage and frequency of the GPU by a predetermined value;

monitoring performance degradation after performing distributed training or inference in the GPU; and when performance degradation occurs, setting a previous voltage and frequency as an optimal voltage and frequency of the GPU.

6. The method of claim 5, wherein performing the control proceeds to decreasing the voltage and frequency of the GPU by the predetermined value when performance degradation does not occur.

7. The method of claim 1, further comprising:

applying an optimized voltage and frequency of the GPU to the communication section while the distributed deep learning is being performed.

8. The method of claim 7, wherein identifying the at least one communication section, performing the control, and applying the optimized voltage and frequency are performed for each of the two or more GPUs.

9. An apparatus for Graphics Processing Unit (GPU) power management in distributed deep learning, comprising:

memory in which at least one program is recorded; and a processor for executing the program, wherein the program performs identifying at least one communication section during a training process or inference process of the distributed deep learning in two or more GPUs and performing control such that a voltage and frequency of the GPU are optimized during the at least one communication section.

10. The apparatus of claim 9, wherein, when performing the control, the program sets the voltage and frequency of the GPU during the at least one communication section to minimum values at which performance of the training process or inference process of the distributed deep learning is not degraded.

11. The apparatus of claim 9, wherein, when performing the control, the program performs inserting voltage and frequency control code into the GPU at at least one of a time point before the at least one communication section, or a time point after the at least one communication section, or a combination thereof.

12. The apparatus of claim 9, wherein, when performing the control, the program performs checking whether the voltage and frequency of the GPU are minimum values; and when the voltage and frequency are the minimum values, setting the voltage and frequency as an optimal voltage and frequency of the GPU.

13. The apparatus of claim 9, wherein, when performing the control, the program performs checking whether the voltage and frequency of the GPU are minimum values;

decreasing the voltage and frequency of the GPU by a predetermined value when the voltage and frequency are not the minimum values;

monitoring performance degradation after performing distributed training or inference in the GPU; and setting a previous voltage and frequency as an optimal voltage and frequency of the GPU when performance degradation occurs.

14. The apparatus of claim 13, wherein, when performing the control, the program proceeds to decreasing the voltage and frequency of the GPU by the predetermined value when performance degradation does not occur.

15. The apparatus of claim 9, wherein the program further performs applying an optimized voltage and frequency of the GPU to the communication section while the distributed deep learning is being performed.

16. The apparatus of claim 15, wherein the program performs identifying the at least one communication section, performing the control, and applying the optimized voltage and frequency for each of the two or more GPUs.

17. A method for Graphics Processing Unit (GPU) power management in distributed deep learning, a training process or inference process of which is performed through two or more GPUs, the method comprising:

identifying at least one communication section during the training process or inference process of the distributed deep learning; and setting a voltage and frequency of each of the two or more GPUs during the at least one communication section to minimum values at which performance of the training process or inference process of the distributed deep learning is not degraded.

18. The method of claim 17, wherein setting the voltage and frequency includes inserting voltage and frequency control code into the GPU at at least one of a time point before the at least one communication section, or a time point after the at least one communication section, or a combination thereof.

19. The method of claim 17, wherein setting the voltage and frequency includes checking whether the voltage and frequency of the GPU are the minimum values; and when the voltage and frequency are the minimum values, setting the voltage and frequency as an optimal voltage and frequency of the GPU.

20. The method of claim 17, wherein setting the voltage and frequency includes checking whether the voltage and frequency of the GPU are the minimum values, decreasing the voltage and frequency of the GPU by a predetermined value when the voltage and frequency are not the minimum values, monitoring performance degradation after performing distributed training or inference in the GPU, and setting a previous voltage and frequency as an optimal voltage and frequency of the GPU when performance degradation occurs, and when performance degradation does not occur, setting the voltage and frequency proceeds to decreasing the voltage and frequency of the GPU by the predetermined value.

* * * * *